United States Patent [19]

Hernandez et al.

[11] Patent Number: 5,501,105
[45] Date of Patent: Mar. 26, 1996

[54] DIGITAL SIGNAL PROCESSING OF ENCODER SIGNALS TO DETECT RESONANCES IN ROTATING MACHINES

[75] Inventors: Walter Hernandez, Potomac, Md.; Richard Sutermeister, Fairfax, Va.

[73] Assignee: Monitoring Technology Corp., Fairfax, Va.

[21] Appl. No.: 290,375

[22] Filed: Aug. 15, 1994

Related U.S. Application Data

[63] Continuation-in-part of Ser. No. 769,821, Oct. 2, 1991, Pat. No. 5,365,787.
[51] Int. Cl.$^6$ .......................... G01H 1/00; G01H 11/00; G08B 23/00; G01N 29/00
[52] U.S. Cl. ...................... 73/660; 324/226; 324/227
[58] Field of Search ............................... 324/226, 227, 324/207.25, 207.11; 73/660, 657, 658; 340/683

[56] References Cited

U.S. PATENT DOCUMENTS 4,391,941 7/1983 Hernandez et al. .
4,426,641 1/1984 Kurihara et al. .

FOREIGN PATENT DOCUMENTS 666454 2/1977 U.S.S.R. .

OTHER PUBLICATIONS

Torsional Vibration Analysis. Application Paper A. R. Crawford, Machine View Incorporated, 1994, pp. 1–9.

Primary Examiner—Walter E. Snow
Attorney, Agent, or Firm—Richard C. Woodbridge

[57] ABSTRACT

The present invention is a method and system for accurately analyzing shaft encoder signals from rotating machines. The invention reduces noise and other interferences in the encoder signals by novel means that yield an unprecedented power for extracting useful information. Signal distortion due to variation in the rotation rate of the machinery and due to FFT leakage are eliminated by acquiring digital values of the encoder signals at a set of discrete times that are determined by the properly averaged rotation rate of the shaft and requiring a fixed integer number of these discrete times per rotation of the shaft. Amplitude modulation is eliminated by proper spectral combination of left and right sidebands of the main encoder signal. Additive noise is removed by multiplying sidebands and averaging the results over a number of data records.

19 Claims, 8 Drawing Sheets

DIGITAL SIGNAL PROCESSING OF ENCODER SIGNALS TO DETECT RESONANCES IN ROTATING MACHINES

CROSS-REFERENCE TO RELATED APPLICATIONS

This application is a continuation-in-part application based upon U.S. application Ser. No. 07/769,821 filed Oct. 2, 1991 and entitled NON-INVASIVE METHOD AND APPARATUS FOR DETERMINING RESONANCE INFORMATION FOR ROTATING MACHINERY COMPONENTS AND FOR ANTICIPATING COMPONENT FAILURE FROM CHANGES THEREIN issued Nov. 24, 1994 as U.S. Pat. No. 5,365,787.

BACKGROUND OF THE INVENTION

1. Field of the Invention

This invention relates to a signal processing method and apparatus for detecting faults and analyzing components that rotate in rotating machinery, and, in particular, it relates to a method and apparatus which analyzes signals from shaft encoders to detect and isolate resonances of these components.

2. Description of Related Art

Machinery shafts and components that are fixed to shafts, such as rotor heads and turbine or compressor blades, may develop cracks or other physical changes during normal use. Such deterioration is, however, generally difficult to detect while the machinery is operating, or even when the machine is disassembled for visual inspection. Vibration measurements, in the x, y or z direction are often used to detect developing problems in rotating machinery. The following prior art techniques may be relevant to this invention: "Method and Apparatus for Monitoring the Shaft Vibration of a Rotary Machine," Inventors Kurihara, Nobuo et al., U.S. Pat. No. 4,426,641; Russian Patent Doc. #0666454; Angular motion sensor, model 361 A. PCB Piezoelectronics, Depew, N.Y.; Torsional Vibration Analysis. A. R. Crawford, Machine View Incorporated, 1994. Application paper. Knoxville, Tenn.; and, "Method and Apparatus for Detecting Geer Defects," Walter C. Hernandez, Edward A. Page and Kenneth A. Lefler, U.S. Pat. No. 4,931,949. Such translational measurements have proven, however, to be relatively insensitive indicators of deterioration in the structural integrity or performance of rotating shafts or the components attached to them, such as the rotors and blades mentioned above. While deterioration in such shaft-associated components produce little translational vibration, they have a measurable effect on the instantaneous rotational velocity of the shaft. This variation is rotational velocity is referred to as the rotational, or torsional, vibration of the shaft. In an attempt to analyze torsional vibration, investigators variously have attached accelerometers or strain gauges to the rotating components and communication is accommodated through slip rings or radio frequency methods. Velocity sensors may be attached to a shaft to provide instantaneous angular velocity. Others have analyzed shaft encoder signals, which yield one or more electronic pulses per shaft rotation. In this, the rate of the encoder pulse train is often converted to a proportional voltage, which is then subject to spectral analysis. Some investigators manually examine the time domain pulses directly for variation in RPM rate. To date, the various methods of torsional vibration analysis have proven inadequate to detect machinery component deterioration except when catastrophic failure is imminent.

The current methods for the analysis of encoders to detect torsional vibration has been hampered by the effects of RPM drift, FFT leakage, and Amplitude Modulation (AM) in addition to random noise. As a result, the predictive information implicit in torsional vibrations in the rotation of a shaft has not been adequately isolated and detected by prior art methods used to date. The present invention incorporates a method and system for managing the various sources of noise and other masking signal components in a manner that enables the detection and measurement of key aspects of the fine structure of the torsional vibration of rotating shafts and their attached components.

SUMMARY OF THE INVENTION

Briefly described, the invention comprises a method and system for measuring rotational, or torsional, vibration in rotating shafts and other machinery components by applying special signal processing methods to shaft encoder signals to reduce or eliminate the various signal components that mask signal components of interest. By tracking these signal components of interest, the invention detects changes in the condition or performance of machinery shafts and their associated components. To this end, signals from encoders typically sensing shaft rotation are conditioned and digitized at a series of initial sample times to create initial digital signals representative of the encoder signals. The initial digital signals, which have spectral components including a carrier signal and its harmonics and sidebands in addition to noise and other signal components, are analyzed to accurately approximate the zero crossing times in the initial digital signals. These zero crossing times are then used to derive new sampling times for interpolating between the values comprising the initial digital signal, such that there is a constant, integral number of new sampling time points per rotation of the shaft. The initial digital data is then interpolated at the new sampling time points. Specifically, the signal values at the initial digital sample times are used to interpolate signal values at the resampling times. The data resulting from resampling is then segmented into digital data records of fixed length representing an integer multiple of the number of shaft rotations. A complex Fourier transformation is performed on successive digital data records. By this method, which maintains coherence between sampling and rotation rates, the frequencies of the carrier signal, its harmonics, and all other signals at shaft-multiple frequencies will be invariant in their spectral locations and exist in single spectral bins even in the presence of such effects as drift in the shaft rotation rate. The sideband components of the resulting spectrum are then combined in a manner that eliminates AM noise. The combined sideband components are then averaged over many data records to greatly reduce random noise. The energy at the shaft harmonics, which lie in single spectral bins, can be removed if so desired to more clearly isolate signals of interest.

The invention may be further understood by reference to the following drawings.

BRIEF DESCRIPTION OF DRAWINGS

FIG. 7 illustrate a lowpass FIR filter for filtering the raw zero crossing times where 7A shows the filter coefficients in the time domain and 7B shows the frequency response of the filter.

DETAILED DESCRIPTION OF THE INVENTION

During the course of this description like numbers will be used to identify like elements according to the different figures that illustrate the invention.

Figure 1:
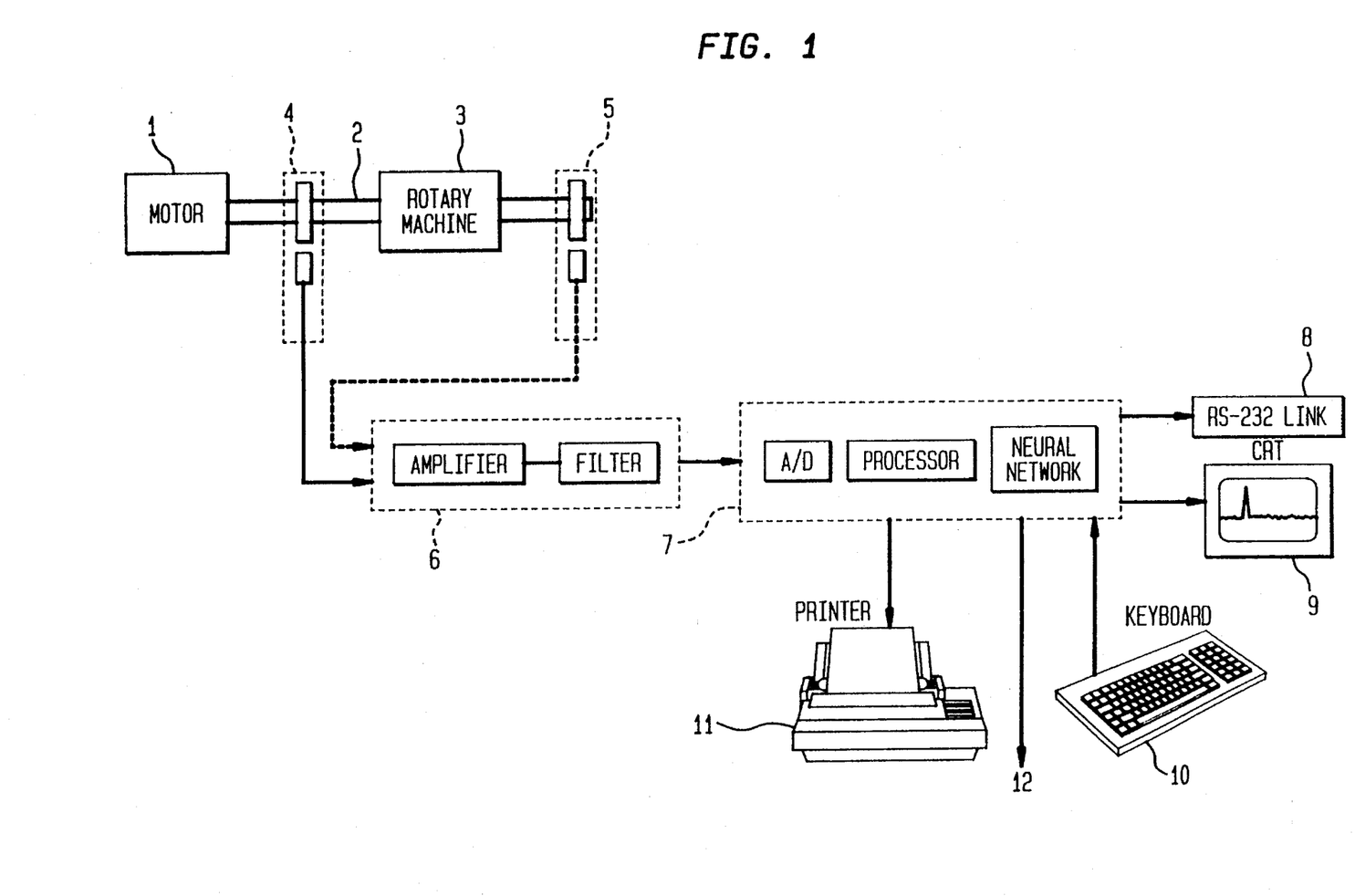
FIG. 1 is a block diagram of the preferred embodiment of the present invention.
Figure 2:
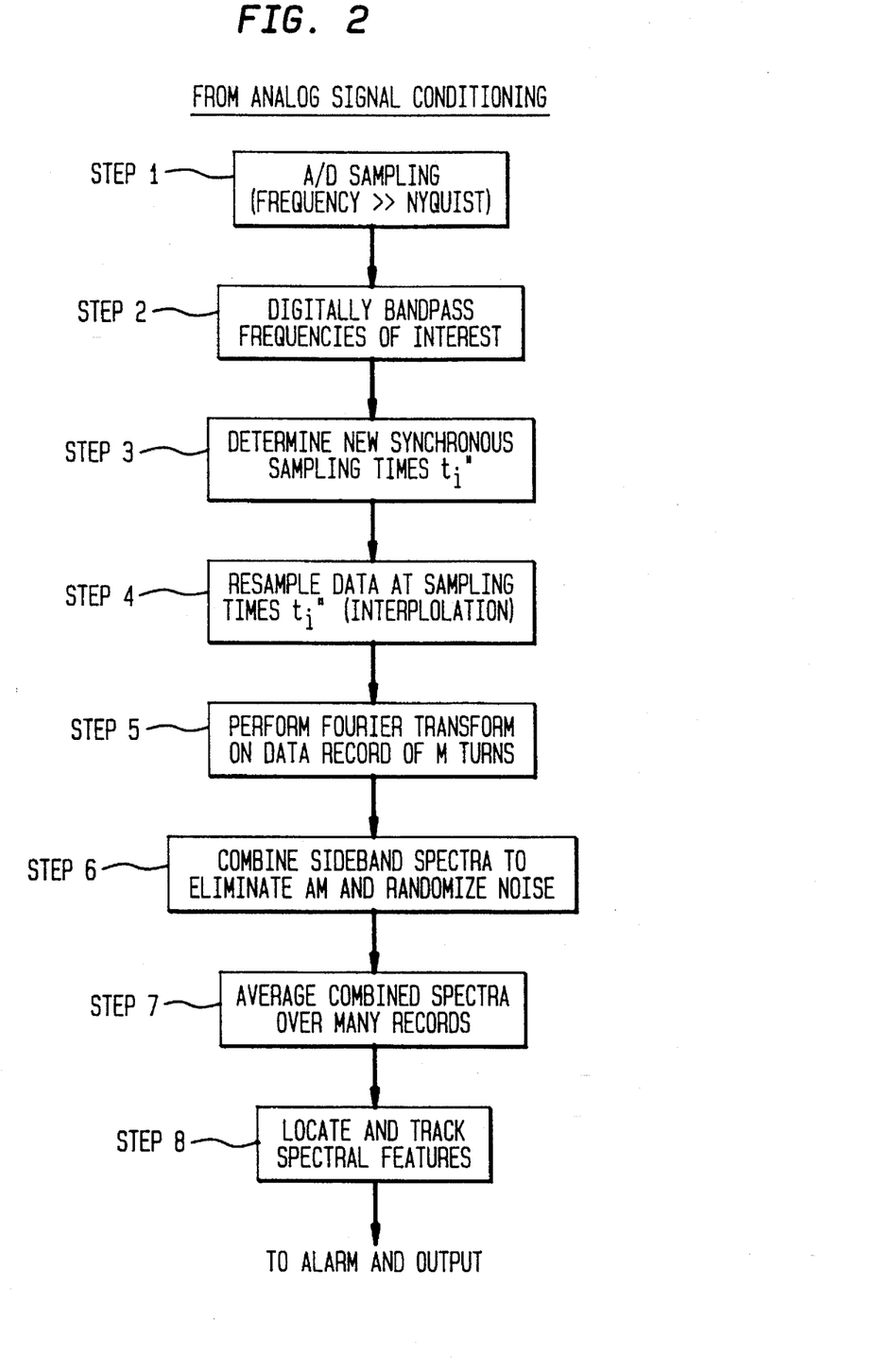
FIG. 2 is a flowchart of the digital signal processing method for the preferred embodiment of the invention wherein a specific digital synchronous sampling method is employed.
Figure 3:
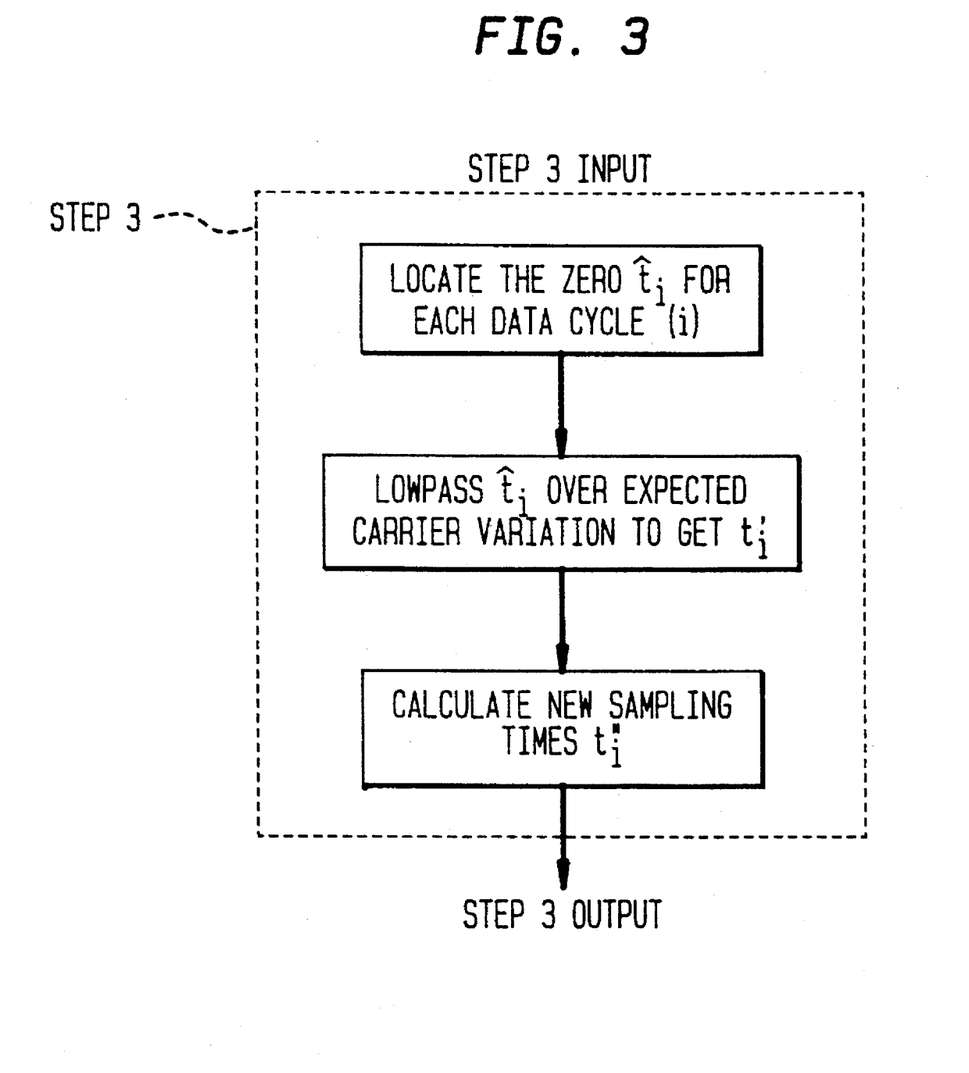
FIG. 3 is a flowchart describing in more detail a synchronous sampling method in which a zero crossing technique is employed.

The invention consists of a device, with a preferred embodiment illustrated in FIG. 1 and a preferred method illustrated in block diagram in FIG. 2, with additional detail provided in FIG. 3. In the preferred embodiment of the device, a shaft encoder or encoders 4 or 5 may be a ferromagnetic gear with N teeth which, as the shaft 2 rotates, induces N pulses per shaft rotation as output from a magnetic sensor, an optical encoder, or any of several other known prior art encoder type devices. More than one encoder 4 or 5 may be used simultaneously to 1) detect signals that may have nodes at one or the other encoder, or 2) allow more robust interpretations of the results. The encoder signal(s) is passed to a signal conditioner 6 which includes means to amplify and filter the encoder signal. The output, a conditioned signal, is passed to a computer 7 that contains an analog-to-digital converter (A/D) and has various input and output devices and connections to other systems.

Figure 4:
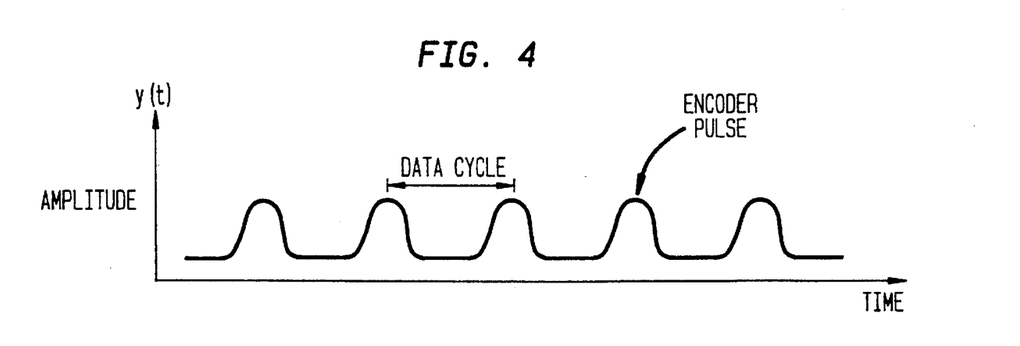
FIG. 4 illustrates a typical raw signal generated by encoder sensor.
Figure 5:
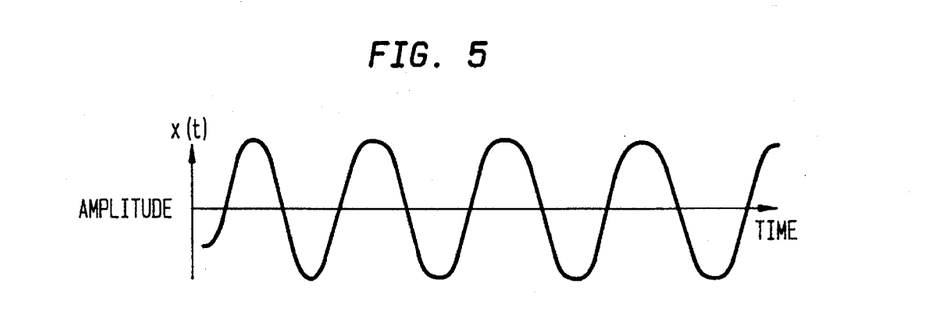
FIG. 5 illustrates an example of a typical digitally band passed signal generated by step 2 shown in the flowchart of FIG. 2.
Figure 6:
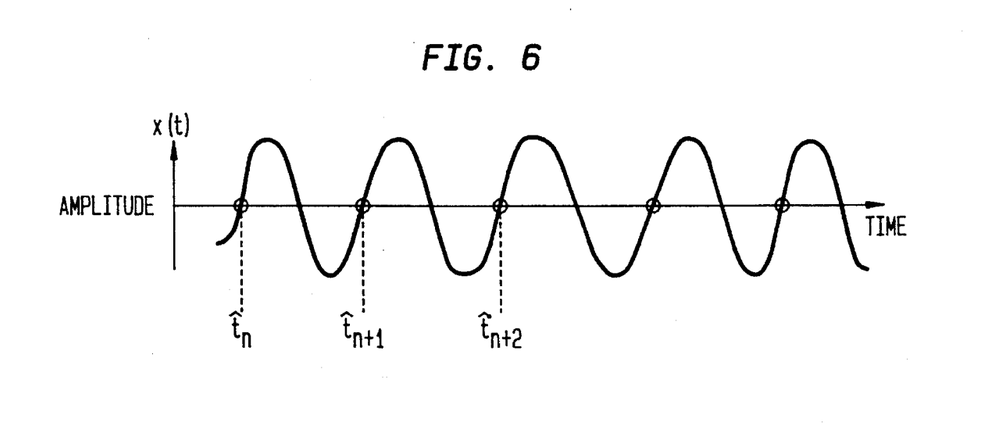
FIG. 6 illustrates the positive slope zeros of the bandpassed signal.

FIG. 4 illustrates a typical raw encoder signal, which is fed to the analog conditioner 6, in which the signals are typically amplified and bandpass filtered to isolate signals of interest. For example, with an encoder 4 or 5 producing N pulses per shaft rotation, a shaft rotation frequency of $F_o$, and torsional vibration frequencies of interest up to a frequency of $F_1$, the band pass filter might be set with lower and upper limits of $(NF_0-F_1)$ and $(NF_0+F_1)$ respectively. For the case where both the first and second harmonics of the encoder carrier are used in the analysis, the pass band limits might be set at $(NF_0-F_1)$ and $(2NF_0+F_1)$ respectively. The signal that has been subject to bandpass filtering is referred to as the conditioned signal. Note, all frequencies are in hertz, Hz, unless otherwise stated.

The upper cut off of the band pass filter also serves as an anti-aliasing filter for subsequent analog-to-digital (A/D) conversion. The conditioned signal is fed to the A/D board of computer 7 shown as step 1 of the method (illustrated in FIG. 2) for digitizing at a series of times $t_i$. In the present invention, the conditioned signal is digitized at a very high frequency HF, typically greater than 10 times that required by the Nyquist criterion, which dictates a sampling rate at least twice that of the highest signal frequency of interest. For a rotation rate of $F_0 \cong 30$ Hz and N=60 teeth an HF sample rate might be between 36,000 and 500,000 Hz. The output of this step is identified as the HF digitized signal. The high sample rate is typically many times the Nyquist.

In step 2 of the method illustrated in FIG. 2, the HF digitized signal is bandpass filtered to remove any residual DC or low frequency components of the signal and to further reduce extraneous signals, resulting in a bandpassed signal.

In step 3 as shown in FIG. 2, the bandpassed signal is analyzed to determine a set of new synchronous sampling times $t_i''$. This may be accomplished with a software implementation of a phase locked loop operating within the computer processor with which a digital sinusoidal signal is generated at approximately the frequency of the fundamental of the bandpassed signal for locking with that bandpassed signal. In this phase locked loop method, the digital sinusoidal signal is multiplied together with the bandpassed signal and a phase detector is used to determine the phase difference between the digital sinusoidal and bandpassed signals. This phase difference is low pass filtered to track only relatively slow changes in the fundamental frequency of the bandpassed signal. The low passed phase difference is then used to control the phase of the generated sinusoidal signal to keep the two signals locked together with respect to both frequency and phase. Finally, the digital sinusoidal signal is used to generate the new clock times $(t_i'')$ for resampling the signal. Thus a fixed phase location on the sinusoidal, e.g., its maximum, is used to estimate the new sampling locations. Typically, the number of sampling points is increased by a factor of 4 or more to exceed the Nyquist criterion for sampling rate.

FIG. 3 provides more detail regarding a specific zero crossing technique as an alternative to using a phase locked loop for determining the new $t_i''$ synchronous sampling time values. In this approach, an estimate, $\hat{t}_i$ is made for the time of each positive slope zero crossing of the bandpassed signal, such as by linear, quadratic or trigonometric interpolation. For example, for the $i^{th}$ zero, which lies between the bandpassed signal values $X_n$ and $X_{n+1}$ which are negative and positive respectively, the linear zero crossing time is given by $\hat{t}_i = \Delta t(n + X_n/(X_{n+1}-X_n))$. Note $\Delta t$ is assumed to be of unit value unless otherwise specified. We know that these zero crossings are affected not only by low frequency drifts in the carrier frequency, but also by higher frequency modulations, random noise and inaccuracies in the zero locating technique.

Figure 7A:
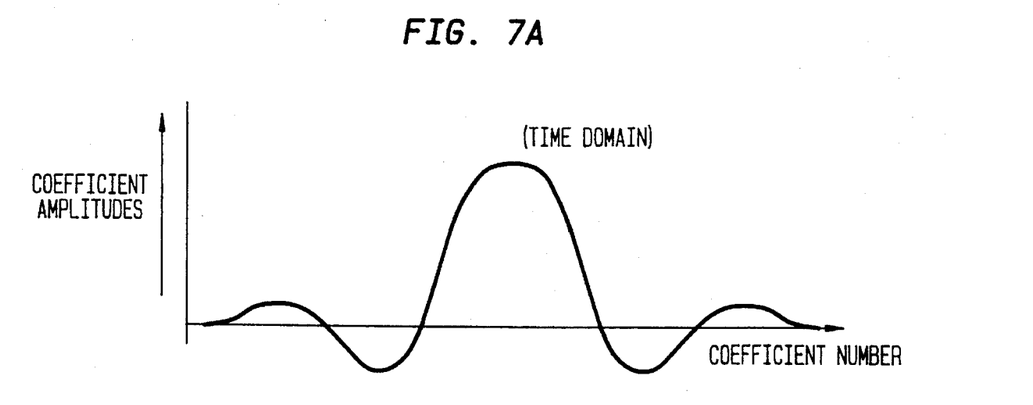
Figure 7B:
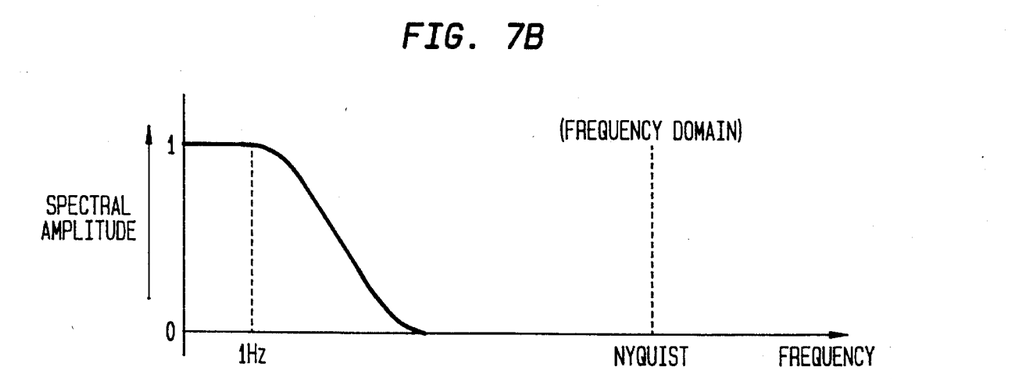

To remove unwanted effects and obtain the sampling times, the $\hat{t}_i$ values are low passed with a digital filter illustrated in FIG. 7. FIG. 7A shows the time domain representation of a typical filter and FIG. 7B shows the frequency domain representation of the filter, which produces an output referred to as $t_i'$. The values of $t_i'$ are used to determine new sampling times $t_i''$ one technique for which is to interpose 3 approximately equally spaced time values between successive pairs of $t_i'$ values. By this, 4 digital sample times are created per tooth period of the carrier signal. Another technique is to determine a new set of $2^k$ sample points for each complete rotation of the shaft via interpolation methods.

Figure 8:
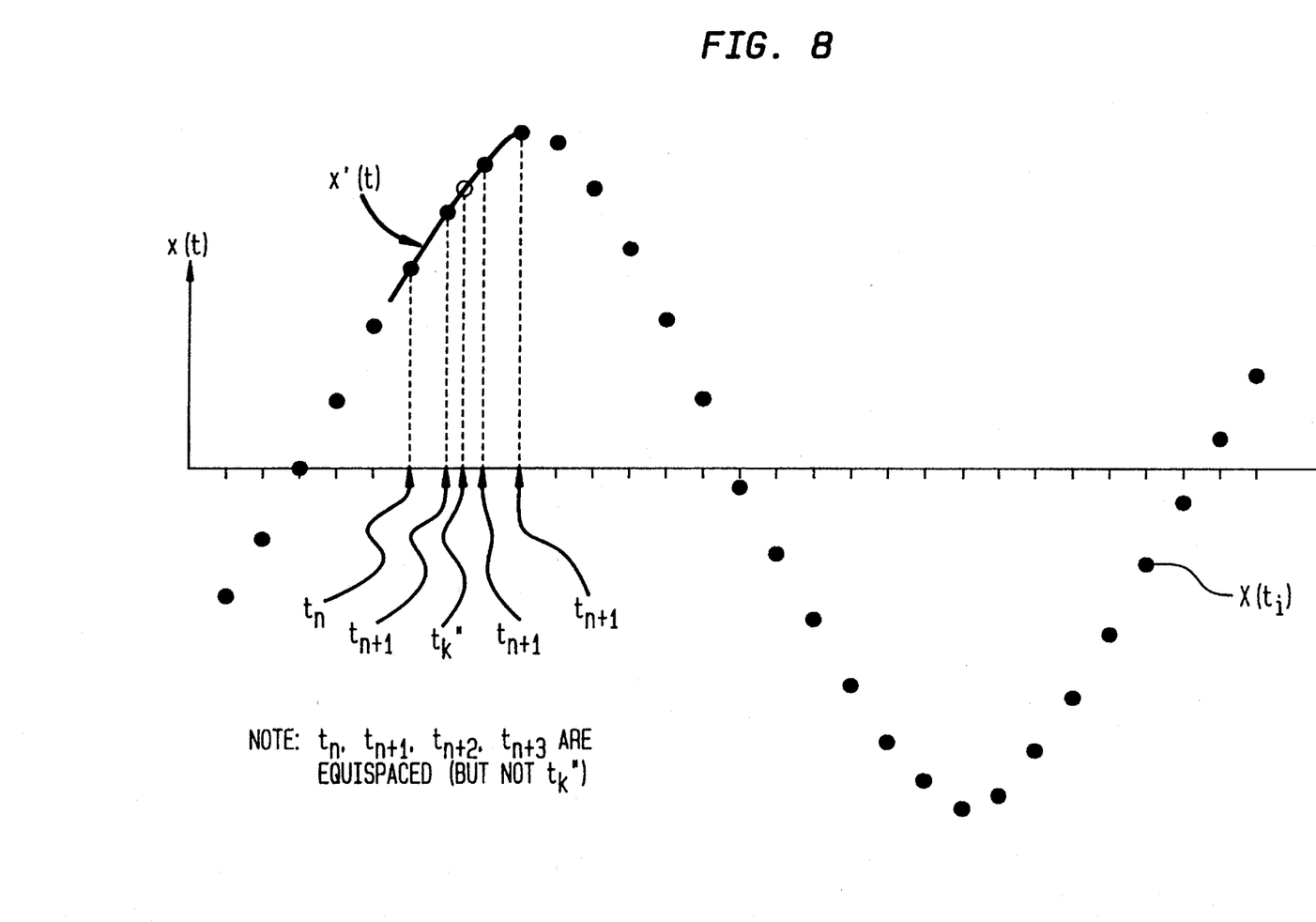
FIG. 8 is a diagram illustrating the data points used in a quadratic interpolation technique for determining the signal values at new sampling times.

In step 4 of the method illustrated in FIG. 2 the values of the bandpassed signal at each $t_i''$ are determined. FIG. 8 illustrates a quadratic interpolation technique for accomplishing this. For interpolation for each $t_k''$, four signal samples of the band-passed signal at points $t_n$, $t_{n+1}$, $t_{n+2}$, $t_{n+3}$ are chosen such that $t_{n+1} < t_k'' < t_{n+2}$. A best-fit quadratic curve $x'(t)$ is fitted with a Least Squares Estimator (LSE) to the band-passed signal data points at n, n+1, n+2, and n+3. This continuous curve is then used to estimate the signal value by $x(t_k'') = x'(t_k'')$ and thereby produce the interpolated data.

As an option one may correct the entire signal for motion of the carrier by including one additional step. Dropping the ('') notation we have the improved value:

$$\hat{x}(t_k) = x(t_k)e^{\frac{-\Pi ikg_k}{2}}$$

where:

$$g_k = 1 - \frac{(t_{k+1} - t_{k-1})}{t_2 - t_0}$$

In step 5 of the method illustrated in FIG. 2, the resampled data is used to calculate complex spectral transforms $F_i(n)$ where i refers to the $i^{th}$ data record. The transform may either a standard discrete Fourier transform (DFT) or a fast Fourier transforms (FFT). If the synchronous sample times $t_i''$ are separated by one-fourth of the period between two teeth, the encoder has N teeth, and the data records correspond to M rotations of the shaft, the data record length, in data points, is:

L=4MN

If the shaft is rotating at approximately $F_0$, this data length will yields a spectral resolution of:

$$\Delta f = \frac{F_0}{M}$$

and complex spectral values defined at 2MN+1 equally spaced spectral bins which together comprise the complex spectrum.

One form of spectral function that might be generated in step 6 of the method illustrated in FIG. 2 is the common power spectral density (PSD) function:

$$P_i(n) = F_i(n)F_i^*(n)$$

*=complex conjugate for each of the n spectral bins. The PSD then could be averaged over many data records as illustrated in step 7 shown in FIG. 2 and analyzed to locate and track spectral features as illustrated by step 8 shown in FIG. 2. It would, however, retain AM and noise components, which may mask the components of interest.

To eliminate AM and random noise components, special cross band combinations are formed to simultaneously eliminate both. According to this technique, the main tooth passing component and the $2^{nd}$ and $3^{rd}$ harmonics can be considered carrier signals located at frequency points $$n_0 = \frac{NF_0}{M}$$

$$2n_0 = \frac{2NF_0}{M}$$

$$3n_0 = \frac{3NF_0}{M}$$

From the complex transform derived in step 5 illustrated in FIG. 2, a new upper sideband of the principle tooth passing frequency is formed as:

$$F_i'(n_0 + k) = \frac{F_i^*(n_0 - k)F_i(n_0) - F_i(n_0 + k)F_i^*(n_0)}{2|F_i(n_0)|}$$

which is phase corrected by the carrier. This function relies on the different phase characteristics of the sideband structure of AM and FM components of the signal to eliminate AM from this new sideband. The lower sideband of the $2^{nd}$ harmonic which is phase corrected by the carrier is given by:

$$F_i(2n_0 - k) = F_i(2n_0 - k) \frac{F_i^*(2n_0)}{|F_i(2n_0)|}$$

The product of the new upper and lower sidebands, which each possess independent noise components, yields:

$G_i(n_0 + k) =$ $$\frac{F_i(2n_0 - k)F_i^*(2n_0)}{2|F_i(n_0)||F_i(2n_0)|} [F_i^*(n_0 - k)F_i(n_0) - F_i(n_0 + k)F_i^*(n_0)]$$

This new cross band function has no AM content but retains random noise components. Note that with the synchronous methods being employed, the $F_i(n_0)$ and $F_i(2n_0)$ terms can be replaced by real unit values.

$G_i$ is subsequently averaged as shown by step 7 of FIG. 2 to eliminate the random noise contributions i.e. forming the function:

$$G(n_0 + k) = \frac{1}{I} \sum_{i=1}^{I} G_i(n_0 + k)$$

Figure 9:
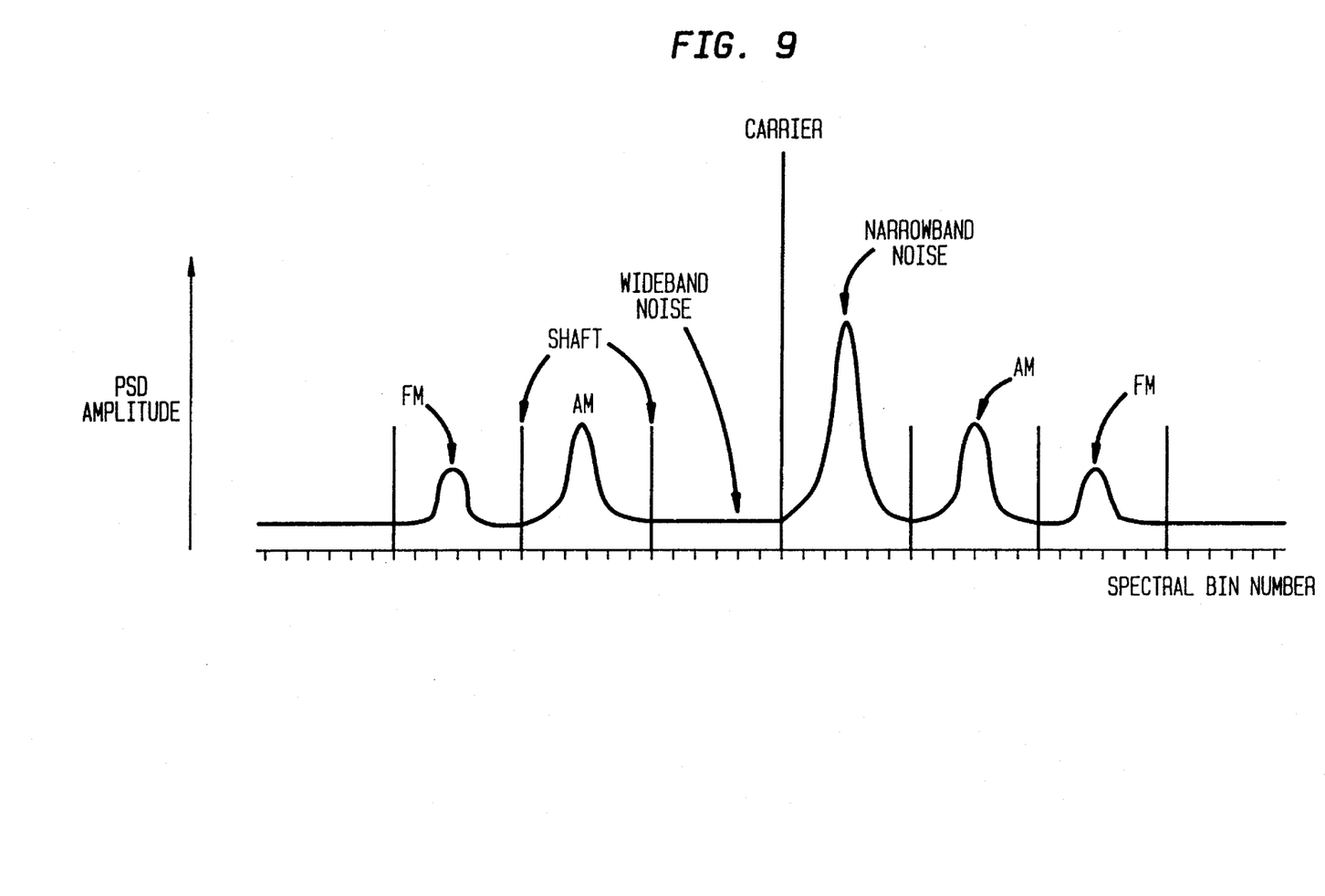
FIG. 9 illustrates a typical high resolution power spectral density in the vicinity of the carrier signal where the leakage has been removed.
Figure 10:
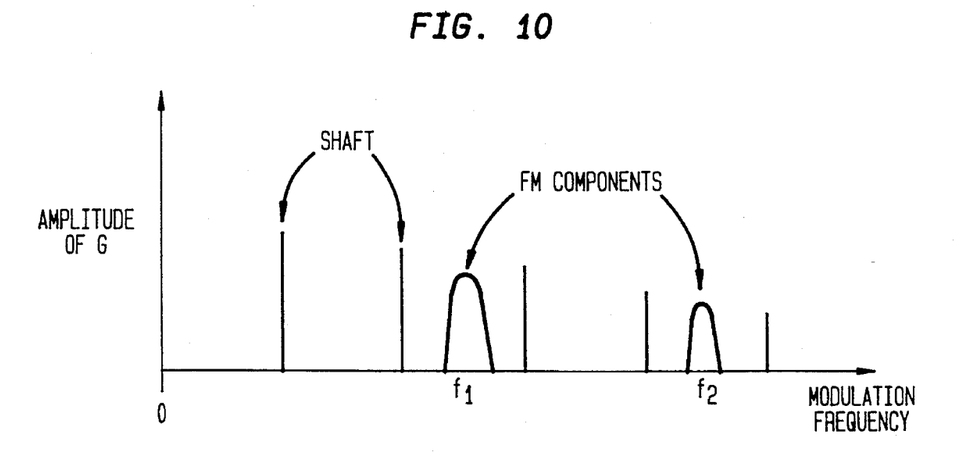
FIG. 10 illustrates a typical result of averaging the combined sideband spectra to remove AM and noise interferences.

If "I" is sufficiently large it is possible to effectively eliminate noise components. FIG. 9 and FIG. 10 illustrate conceptually the effects of removing noise and AM in comparison to the common PSD function.

With the removal of extraneous signal components, spectral peaks corresponding to diagnostic system resonances can be better located and tracked as illustrated by step 8 of FIG. 2. For example, all spectral components with greater than threshold power can be located and the moments for each calculated periodically. Significant changes in the moments over time indicate changes in the system's resonance structure that can be a useful diagnostic tool to identify the deterioration of the machinery. The output might also serve as the input to a subsequent analysis by an artificial neural network program that is run on the computer 7, or by an external device 12.

Figure 11:
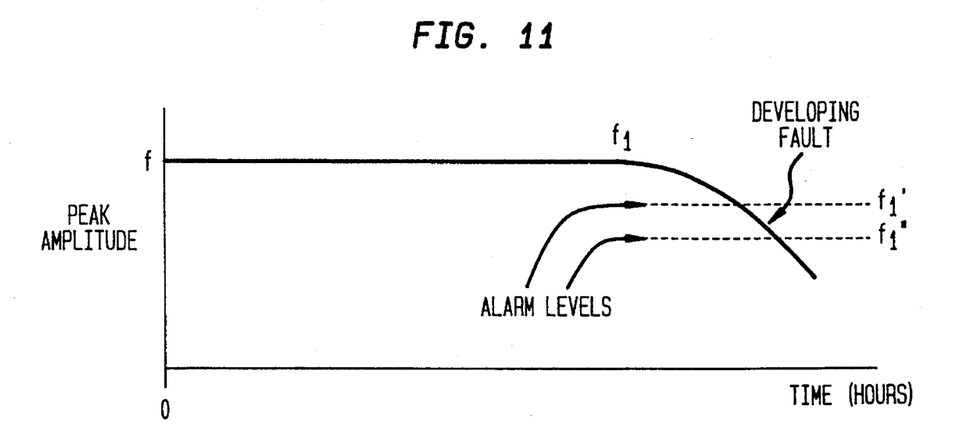
FIG. 11 illustrates a typical trend curve for modal frequency tracking with alarm levels depicted.

FIG. 11 illustrates a trend curve for the first moment (i.e., mean) of a component and alarm levels entered via the keyboard 10 that trigger warnings via an RS-232 link 8, CRT display 9, hard copy print out to the operator 11, or automatically shut down a machine via the RS-232 link 8.

In summary, the preferred embodiment includes: a signal conditioner and a computer, such as an IBM compatible 486 personal computer. The signal conditioner is composed of standard analog electronics that amplify and filter the sensor signal. The computer is configured with a standard internal analog-to-digital converter such as the Data Translation Model 2836 and a standard board designed to implement an artificial neural network program, as well as standard input and output devices. It should be noted that digitizing the encoder signal prior to conditioning would enable digital signal condition and the elimination of the analog electronics 7.

While the invention has been described with reference to its preferred embodiment, it will be appreciated by those skilled in the art that modifications may be made to the steps and techniques described herein without departing from the spirit and substance of the invention as a whole.

We claim:

1. A method for analyzing the torsional and bending vibration of a rotary machine comprising the steps of:
   a) acquiring at least one raw signal representative of the instantaneous rotational velocity of at least one shaft of said rotary machine;
   b) conditioning said raw signal to produce conditioned signals;
   c) digitizing said conditioned signals at an initial rate greater than required by the Nyquist criterion to produce initial digital signals and forming initial digital records therefrom each comprised of a portion of said initial digital signal;
   d) processing said initial digital signal records to produce an enhanced signal wherein selected torsional vibration components are enhanced and other signal components are reduced;
   e) averaging said enhanced signals so to remove selected random signal components; and
   f) analyzing said averaged enhanced signals to determine the torsional and bending vibration parameters of said rotary machine.

2. The method according to claim 1 wherein said raw signals are acquired by means of at least one shaft encoder which generates N approximately equally spaced electronic pulses for each rotation of said shaft.

3. The method according to claim 1 wherein said conditioning step (b) consists of amplifying and low pass filtering said raw signals to generate said conditioned signals.

4. The method according to step d of claim 1 wherein said initial digital signal is resampled at a rate that produces a fixed number of samples in said initial digital signal per rotation of said shaft, said samples being at approximately equally spaced angular intervals.

5. The method according to claim 4 wherein said processing of said initial digital signal is used to determine a series of interpolation times having a fixed number per rotation of said shaft.

6. The method according to claim 5 wherein said series of interpolation times is used to interpolate new values of the function describing said initial digital signal.

7. The method according to claim 5 wherein said step of processing said initial digital signal consists of the additional steps of:
   g) estimating selected zero crossing times of said initial digital signals to generate a zero crossing times signal;
   h) digitally low pass filtering said zero crossing times signal so that components representing slow variations in said rotational velocity rate of said shaft are included and other components representing higher frequency variations of said rotational velocity rate are eliminated to produce a filtered zero crossing times signal; and,
   i) using said filtered zero crossing times to determine said series of interpolation times for said interpolation to produce said new signal.

8. The method according to claim 1 wherein said digitizing is performed at a rate that may exceed said Nyquist criterion by up to hundreds of times.

9. The method according to claim 7 wherein said estimating of said zero crossing times is accomplished by linear interpolation from neighboring data samples that immediately precede and follow each zero crossing.

10. The method according to claim 4 wherein said fixed number of synchronous samples per shaft rotation is chosen to be an integer power of 2.

11. The method according to claim 6 wherein said interpolation methods comprises a least squares estimator to a polynomial or trigonometric interpolator.

12. The method according to claim 1 wherein said digital signals are enhanced in step d by:
   j) forming a Discrete Fourier Transform (DFT) of said initial digital signal records which are of a fixed length, said DFT being comprised of various spectral complex components including carrier frequency harmonics and sidebands thereto; and,
   k) combining said complex spectral components of said DFT to form a new spectral function that eliminates selected undesirable components and enables the elimination of others when said new spectral function is averaged over a plurality of said initial digital signals records to produce an averaged spectrum.

13. The method of claim 12 wherein said sideband spectral components of one harmonic of said carrier are combined to eliminated amplitude modulation (AM) components.

14. The method of claim 12 wherein in step k said sideband spectral components are combined to form said new spectral function, which when averaged over a plurality of said initial digital signal records as defined in step e reduces said random components substantially to zero.

15. The method according to claim 12 wherein in step k said sideband spectral components for two separate harmonics of said carrier are combined such that in said averaged spectrum of step e both AM and random noise components are reduced substantially to zero.

16. The method according to claim 1 wherein said averaged spectrum is analyzed to detect characteristics of said averaged spectrum, including resonance peaks.

17. The method according to claim 16 wherein selected spectral components, including FM resonance peaks, of said averaged spectrum are located, tracked in time and used to trigger alarm levels.

18. The method of claim 17 wherein said selected spectral components and derivatives thereof are the input to a neural network in which they are classified and trigger said alarms.

19. The method according to claim 5 wherein said processing of said initial digital signals employs a digital phase locked loop to determine the slowly varying fundamental frequency of shaft rotation rate; and employ said slowly varying fundamental frequency of shaft rotation rate to generate synchronous sampling times comprising said series of interpolation times.

* * * * *